(No Model.)
E. G. LATTA.
BICYCLE.
No. 312,277. Patented Feb. 17, 1885.
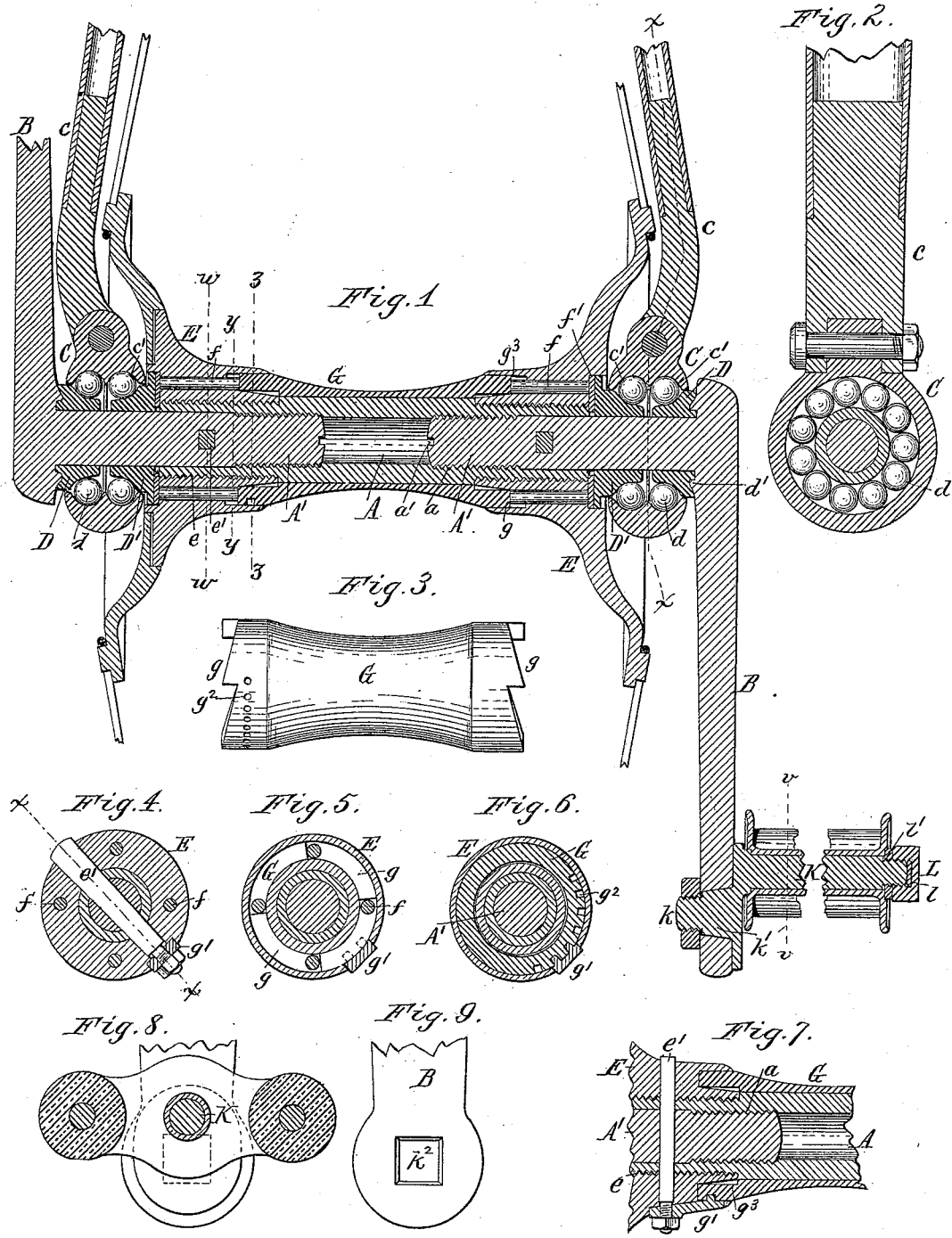

(No Model.) 3 Sheets—Sheet 2.
E. G. LATTA.
BICYCLE.
No. 312,277. Patented Feb. 17, 1885.
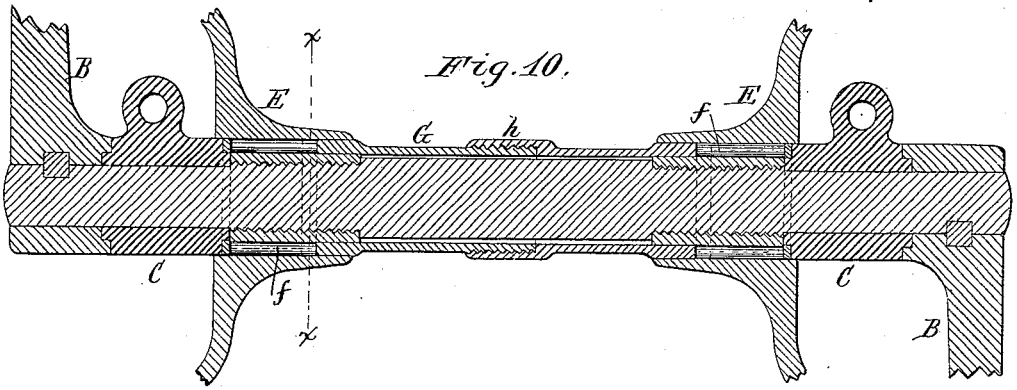
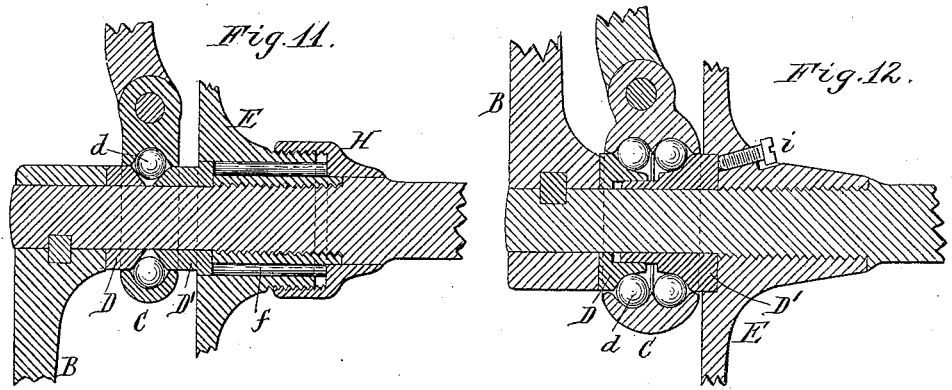
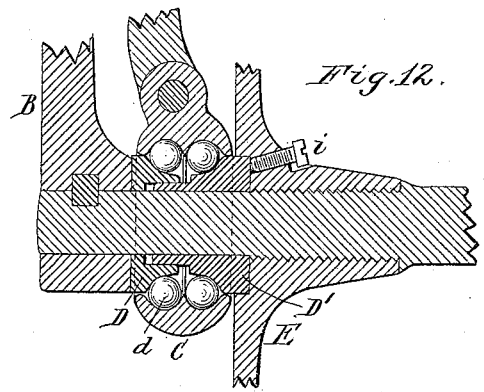
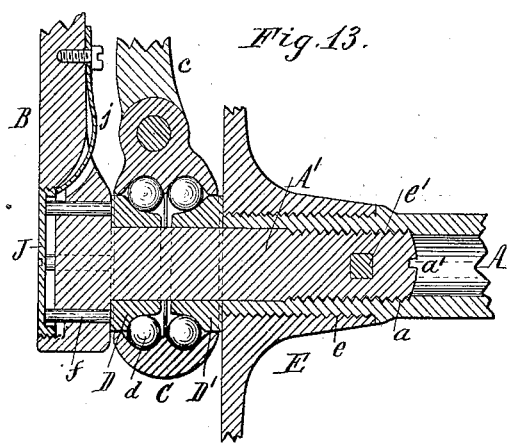
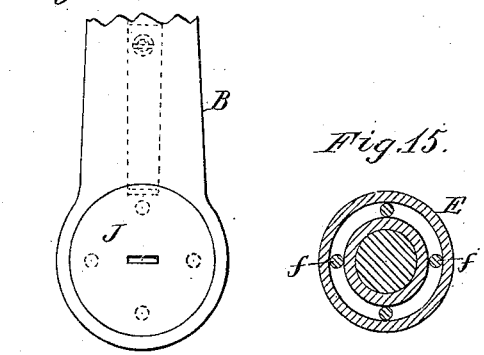
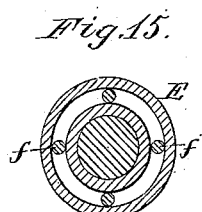
Witnesses: Geo. E. Pitman, Theo. L. Popp
E. G. Latta, Inventor
By Wilhelm & Bonner, Attorneys.

(No Model.) 3 Sheets—Sheet 3.

E. G. LATTA.
BICYCLE.

No. 312,277. Patented Feb. 17, 1885.

Witnesses: Geo. E. Pitman, Theo. L. Popp

E. G. Latta, Inventor.
By Wilhelm & Bonner,
Attorneys.

UNITED STATES PATENT OFFICE.

EMMIT G. LATTA, OF FRIENDSHIP, NEW YORK, ASSIGNOR, BY DIRECT AND MESNE ASSIGNMENTS, TO THE POPE MANUFACTURING COMPANY, OF HARTFORD, CONNECTICUT.

BICYCLE.

SPECIFICATION forming part of Letters Patent No. 312,277, dated February 17, 1885.

Application filed June 13, 1883. (No model.)

*To all whom it may concern:*

Be it known that I, EMMIT G. LATTA, of Friendship, in the county of Allegany and State of New York, have invented new and useful Improvements in Bicycles, of which the following is a specification.

This invention relates to improvements in the driving-wheels of bicycles, and has for its object to so construct the ball-bearings that they will be safe in case of accident, and to provide the ball-bearings with adjusting devices without interfering with the closest possible build of the wheel, and to permit both bearings to be adjusted simultaneously and alike; also, to render the pedals adjustable in such manner that the stroke can be lengthened or shortened at desire without danger of slipping the pedals on the crank and without disfiguring the end of the crank with a slot; also, in rendering the pedals adjustable in such manner that the end wear can be taken up; and, also, to simplify the construction of the cranks and shaft of the driving-wheel, whereby a stronger and simpler bearing is produced and a closer build obtained than heretofore.

My invention consists, to that end, of the improvements which will be hereinafter fully described, and pointed out in the claims.

Figure 16:
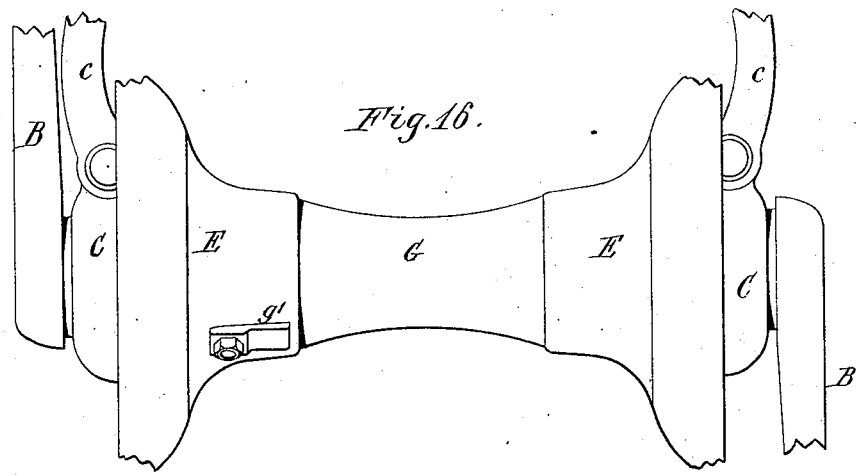
Figure 17:
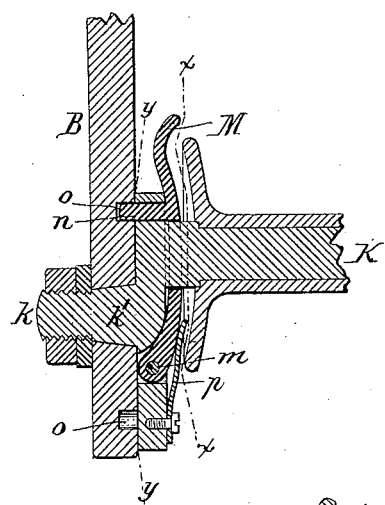
Figure 18:
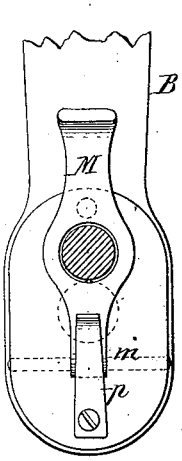
Figure 19:
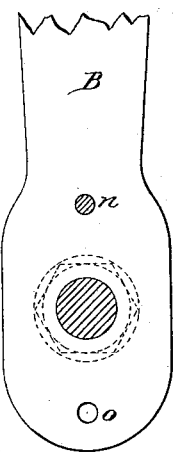
Figure 20:
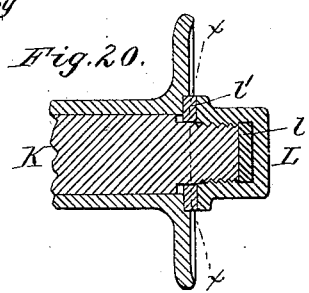
Figure 21:
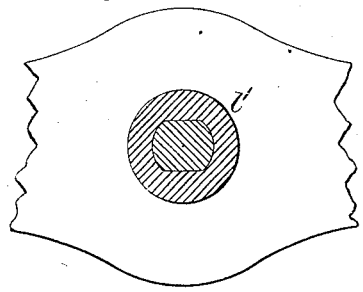

In the accompanying drawings, consisting of three sheets, Figure 1 is a transverse sectional elevation of the central portion of the driving-wheel of a bicycle provided with my improvements. Fig. 2 is a vertical section in line $x\,x$, Fig. 1. Fig. 3 is an elevation of the sleeve whereby the bearings are adjusted. Figs. 4, 5, and 6 are cross-sections in lines $w\,w$, $y\,y$, and $z\,z$, Fig. 1, respectively. Fig. 7 is a cross-section in line $x\,x$, Fig. 4. Fig. 8 is a sectional elevation in line $v\,v$, Fig. 1. Fig. 9 is a front elevation of the outer end of the crank. Fig. 10 is a transverse section showing a modified construction of the device whereby both bearings are adjusted simultaneously, the device being applied to ordinary parallel bearings. Figs. 11, 12, and 13 are sectional elevations showing modified constructions of the adjusting devices whereby the ball-bearings are adjusted. Fig. 14 is a front elevation of the inner end of the crank represented in Fig. 13. Fig. 15 is a cross-section in line $x\,x$, Fig. 10. Fig. 16 is a transverse elevation of the central portion of the wheel. Fig. 17 is a sectional elevation of a modified construction of the adjustable pedal-fastening. Fig. 18 is a sectional elevation of the locking-lever whereby the pedal is secured in place, in line $x\,x$, Fig. 17. Fig. 19 is a sectional elevation of the same in line $y\,y$, Fig. 17. Fig. 20 is a sectional view of the outer end of the pedal on an enlarged scale. Fig. 21 is a cross-section in line $x\,x$, Fig. 20.

Like letters of reference refer to like parts in the several figures.

A represents the cylindrical head or tubular portion of the axle, and A' A' represent the outer or end portions of the axle, secured with their inner ends in the portion A by screw-threads $a$.

B B represent the cranks, which are formed in one piece with the outer portions, A', of the axle, whereby a strong smooth crank is produced, which is free from projecting keys or other fastenings, and whereby a closer build is obtained than is possible when the cranks are secured to the axle outside of the bearings. The inner ends of the portions A' of the axle are provided with notches $a'$, so that in case the axle is broken in rear of the crank the stub can be removed by unscrewing the opposite crank and inserting a screw-driver into the slot $a'$.

$c\,c$ represent the forks, and C the bearing-boxes attached to the forks.

D D' represent loose collars or sleeves mounted on the portions A' of the axle, and $d\,d$ represent the balls arranged between the collars D D' and the boxes C. The boxes C are provided with two annular grooves, $c'$, made about one-half as deep as the diameter of the balls, and of such shape that the outer portion of each groove does not touch the balls, but simply serves to keep out dust and retain the oil, the ball-bearings being arranged against the upper and inner portions of the grooves $c'$. The collars D D' are constructed with curved, concave, or conical inner edges, which bear against the balls, and which force the balls, as the collars approach each other, against the inner edges of the grooves $c'$ in the box C, and thereby readily secure the proper adjustment of all parts of the bearing. Both collars D D' are free to turn on the axle, so that if a ball should break the collar is locked to the box by the broken ball, and the axle will turn in the collar as in an ordinary parallel bearing. When the parts are in their normal working condition, the outward pressure of the balls holds the collars against the crank and hub to create sufficient friction to compel the collars to turn with the axle. The crank is provided on its inner side with an annular bead or rim, $d'$, which surrounds the portion $A'$ of the axle, and projects into a corresponding annular groove in the outer collar, D, and serves to exclude dust, &c., from the cylindrical bearing-surface of the portion $A'$ of the axle. This construction is also employed with ordinary parallel bearings, and enables the manufacturer to supply either parallel or ball-bearings with the same crank and axle.

E E represent the hubs of the wheel, which are secured to the tubular portion A and end portions, $A'$, of the axle by screw-threads $e$ and keys $e'$.

$f$ represents pins or bolts seated in openings in the hubs E and arranged parallel with the axle. The outer ends of the pins $f$ bear against the inner collars, $D'$, of the bearings, or against washers $f'$ interposed between the inner ends of the pins $f$ and the inner collars, $D'$, of the bearings, so that by moving the pins $f$ outwardly the inner collar, $D'$, will be pressed against the inner row of balls $d$, the latter against the box C, the box against the outer row of balls $d$, and the last-named balls against the outer end of the collar D, thereby adjusting all parts of the bearing simultaneously. The pins $f$ are adjusted by means of a sleeve, G, which turns loosely on the inner portion, A, of the axle, and is provided at both ends with inclines or cam-faces $g$, which bear against the inner ends of the pins $f$, so that by turning the sleeve G on the axle all of the pins $f$ are adjusted simultaneously. After having been adjusted, the sleeve G is secured in position by means of a dog, $g'$, which is constructed with one or more teeth on its inner side adapted to engage in holes $g^2$, formed in the sleeve, and which is secured to one of the hubs E by one of the keys $e'$, as represented in Figs. 4 and 7. The outer cam-faced ends of the sleeve G project into annular recesses $g^3$, formed in the inner ends of the hubs E, whereby dust is excluded from the ends of the sleeve G.

Instead of providing the sleeve G with cam-faced ends, as represented in Fig. 3, it may be constructed in two parts, having their inner ends connected by screw-threads $h$, as represented in Fig. 10, so that the outer ends of the divided sleeve, bearing against the pins $f$, can be moved outwardly or inwardly by turning one of the parts of the sleeve in one or the other direction; or, if desired, each bearing can be adjusted independently of the other by means of a screw-sleeve, H, working on the threaded portion of the hub E, as represented in Fig. 11, or by means of a screw, $i$, working in a threaded hole in the hub E, as represented in Fig. 12. In this case the inner sleeve, $D'$, preferably extends into the outer sleeve, D, as shown, to give the inner movable sleeve a long bearing on the axle. If desired, the outer collar, D, of the bearing may be adjusted by arranging the pins $f$ in the inner portion of the crank, as represented in Fig. 13, and adjusting the pins by means of a screw-threaded disk or nut, J, which works in a threaded recess in the outer side of the crank and bears against the outer ends of the pins $f$. The disk J is locked in position by a spring, $j$.

K represents the pedal-pin, and $k$ the bolt by which this pin is secured to the crank. The bolt $k$ is arranged out of line with the pin K, so that upon turning the bolt $k$ in its seat in the crank the distance from the pin K to the center of the axle is increased or reduced, as may be desired. The bolt $k$ is preferably constructed with a square neck, $k'$, which fits in a square opening, $k^2$, in the crank, and whereby a pedal-pin is prevented from turning on the bolt $k$ as a center when it is secured to the crank. By giving the bolt $k$ a half-turn in its seat the pedal-pin is adjusted for a long or short stroke, as the case may be, and by giving the bolt $k$ a quarter-turn the pedal-pin is adjusted for a stroke intermediate between the long and short stroke. This construction leaves the end of the crank smooth and of better appearance than if made with the usual slot, and enables the manufacturer to supply machines with cranks having any desired length of stroke by inserting the pedal-pin at the desired distance from the center of the bolt $k$. The outer end of the pedal is made adjustable for end wear by means of a nut, L, Fig. 20, and thin washers $l$, to be applied or removed, as may be necessary, to enable the nut to force the sliding washer $l'$ closer against the end of the pedal.

Figs. 17, 18, and 19 represent a device for securing the pedal to the crank in such a manner that the length of the stroke can be adjusted by the rider without dismounting. In this construction the neck $k'$ of the bolt $k$ is made round or conical, so that it can freely turn in its seat in the crank, and the pedal is locked in position by means of a locking-lever, M, which is pivoted at $m$ to the base of the pedal-pin, and provided with a stud, $n$, which is adapted to engage in one of several holes, $o$, formed in the crank. The free end of the locking-lever M projects beyond the collar at the inner end of the pedal, and is curved outwardly, so that it can be pressed outwardly by the foot when the pedal is to be adjusted. The locking-lever M is held in engagement with the crank by a spring, $p$.

In Fig. 17 the pedal is shown adjusted for the short stroke. If the rider desires to adjust the pedal for a long stroke, he places his foot upon the upper end of the locking-lever M when the pedal is below the axle and presses the locking-lever outward, thereby disengaging it from the crank and permitting the pedal-pin to turn on the bolt $k$ as a center.

When the pedal-pin reaches its lowest position, the stud $n$ of the locking-lever M engages automatically with the opening $o$ in the outer end of the crank and locks the pedal in this position. When the rider desires to adjust the stroke from long to short, the locking-lever M is released when the pedal is above the axle. This means of attaching the pedal to the crank enables the rider to change from a short to a long stroke without dismounting whenever a heavy grade or bad piece of road requires it, and to change back to a short stroke when a good road is reached.

I claim as my invention—

1. A sectional axle for bicycle-wheels, composed of a tubular central portion and end portions secured in the central portion by screw-threads, and provided at their inner ends with notches $a'$, substantially as set forth.

2. The combination, with an axle, of a bearing-box, collars fitted loosely on the axle, and balls interposed between the collars and the grooved box, said collars being adapted to turn with the axle when the parts are in their normal condition, and to form a stationary bearing for the axle when the friction between the collars and the box becomes greater than that between the axle and the collars, substantially as set forth.

3. The combination, with an axle, of two bearing-boxes, a hub arranged on the axle between said bearing-boxes, collars mounted on the axle on both sides of the hub, and mechanism whereby both collars can be simultaneously adjusted lengthwise on the axle, substantially as set forth.

4. The combination, with an axle, of a bearing-box, collars fitted loosely on the axle, balls interposed between the collars and the box, and sliding pins or bolts bearing against one of said collars, and mechanism whereby said pins are adjusted, substantially as set forth.

5. The combination, with an axle, of a bearing-box, collars fitted loosely on the axle, balls interposed between the collars and the box, a perforated hub, sliding pins bearing against one of said collars, and a sleeve having cone-shaped or inclined ends whereby said pins are adjusted, substantially as set forth.

6. The combination, with a crank, of a pedal having a pin, K, and eccentric fastening-bolt $k$, and an automatic locking-lever, M, substantially as set forth.

7. The combination, with a rotary main crank, of an auxiliary crank fulcrumed upon the main crank, and having a pedal mounted in its outer end, and a locking device for holding said auxiliary crank in the adjusted positions upon the rotary main crank, substantially as set forth.

EMMIT G. LATTA.

Witnesses:
M. W. POTTER,
S. E. LATTA.